United States Patent [19]

Stuparits et al.

[11] Patent Number: 4,558,188

[45] Date of Patent: Dec. 10, 1985

[54] ARRANGEMENT FOR LINE JUMPER TESTING

[76] Inventors: Jeffrey J. Stuparits, 5095 Pine Ridge; Russell L. Cramer, 5056 Lake Harbor Rd., both of Muskegon, Mich. 49441

[21] Appl. No.: 563,738

[22] Filed: Dec. 21, 1983

[51] Int. Cl.$^4$ ............................................. H04M 3/30
[52] U.S. Cl. ............................................. 179/175.2 D
[58] Field of Search ................. 179/175.2 D, 175.2 B, 179/175.2 C, 175.2 R, 27 FE, 18 AB, 175.23

[56] References Cited

U.S. PATENT DOCUMENTS 4,453,049  6/1984  Daniels et al. ............ 179/175.2 B X Primary Examiner—Stafford D. Schreyer

[57] ABSTRACT

An arrangement for testing the connection from a new switching system to a subscriber line, which is also operationally connected to an electro-mechanical switching system. Operational service is to be transferred from the electromechanical switching system to a digital switching system. The arrangement for verifying the subscriber's line connection provides a high frequency current transmitted through the exchange to be removed from service, through the subscribers double jumper connection to the new exchange line equipment, via a capacitor direct current isolator to a test bus associated with the subscriber's line equipment.

6 Claims, 5 Drawing Figures

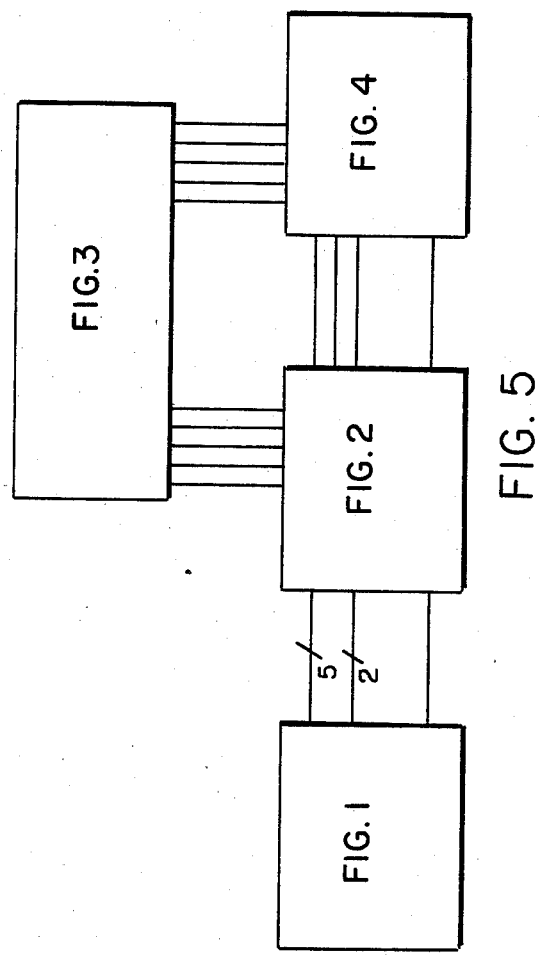

ARRANGEMENT FOR LINE JUMPER TESTING

CROSS-REFERENCE TO RELATED APPLICATIONS

The present application is related to copending U.S. patent application Ser. No. 563,737, filed 12-21-83 having the same inventors and being assigned to the same assignee.

BACKGROUND OF THE INVENTION

The present invention pertains to pre-cutover switching system testing and more particularly to an arrangement for line jumper verification.

When a new switching system, such as a GTD-5 EAX, is installed to replace an existing switching system such as a step-by-step system, there is a testing interval during which time the subscriber's cables are double jumpered to both switching systems. That is, each subscriber line will have an appearance on an inlet to each switching system. This double jumpering arrangement is made at the main distribution frame.

Without special provisions, the line of each subscriber would be connected to a battery feed device from each switching system. Connection of the subscriber's line to battery feed devices of both switching systems would produce a shunting effect and result in improper signaling and supervisory functions, as well as affecting the quality of voice transmission. Therefore, selective isolation of the subscriber's line from these battery feed devices is highly desirable.

Accordingly, it is the object of the present invention to isolate particular subscriber lines in a pre-cutover environment for line jumper verification.

SUMMARY OF THE INVENTION

An arrangement for single line testing in a pre-cutover switching configuration includes a number of switching system subscribers which will have their operative connection changed from a first switching system to another switching system. The first switching system operatively connects these subscribers to one another or to any of the other switching system subscribers.

The switching system subscribers of the first switching system are at this time simultaneously connected to a second switching system which is in an untested condition. The second switching system includes a switching network connected to the subscribers, and a processor complex connected to the switching network.

In the pre-cutover environment, the switching network access to the system subscriber is arranged to open the direct current circuit of the subscribers to the switching network. The second switching system includes an arrangement where in the switching network access to the system subscribers is via a normally closed contact arrangement. That is, the line conductors of each subscriber pass through a pair of contacts to complete the subscriber loop to the switching equipment. These contacts are included to facilitate future maintenance and if necessary isolation of the lines from the network, merely, by the insertion of an insulating card into the jack formed by this set of contacts. In the present invention a printed circuit card is inserted into this jack. This card includes circuitry to contact both the subscriber end and the switching system end of the subscriber loop path and places a capacitor into this path.

A testing system is connected to the first switching system and to the switching network of the second switching system for the single line testing arrangement. The testing system requests connection through both the first and second switching systems to a subscriber. As a result, the subscriber is connected to the testing system through the first and second switching arrangements and the switching network of the second switching system.

The processor complex of the second switching system operates in response to this request to also operate a test relay to connect the subscriber line to a test bus. As a result, the subscriber line is connected to the testing system through the first and second switching systems. The testing system will then send a 20 kHz tone through the old office switching system, through the double jumpering arrangement, via the inserted capacitors, through the contact of the operated test relay and the test bus to a tone sensor of the test system. If no tone is sensed then a trouble report is typed.

DESCRIPTION OF THE DRAWINGS

FIG. 5 shows how FIGS. 2, 3 and 4 may be placed to disclose the novel system of the invention.

DESCRIPTION OF THE PREFERRED EMBODIMENT

Figure 1:
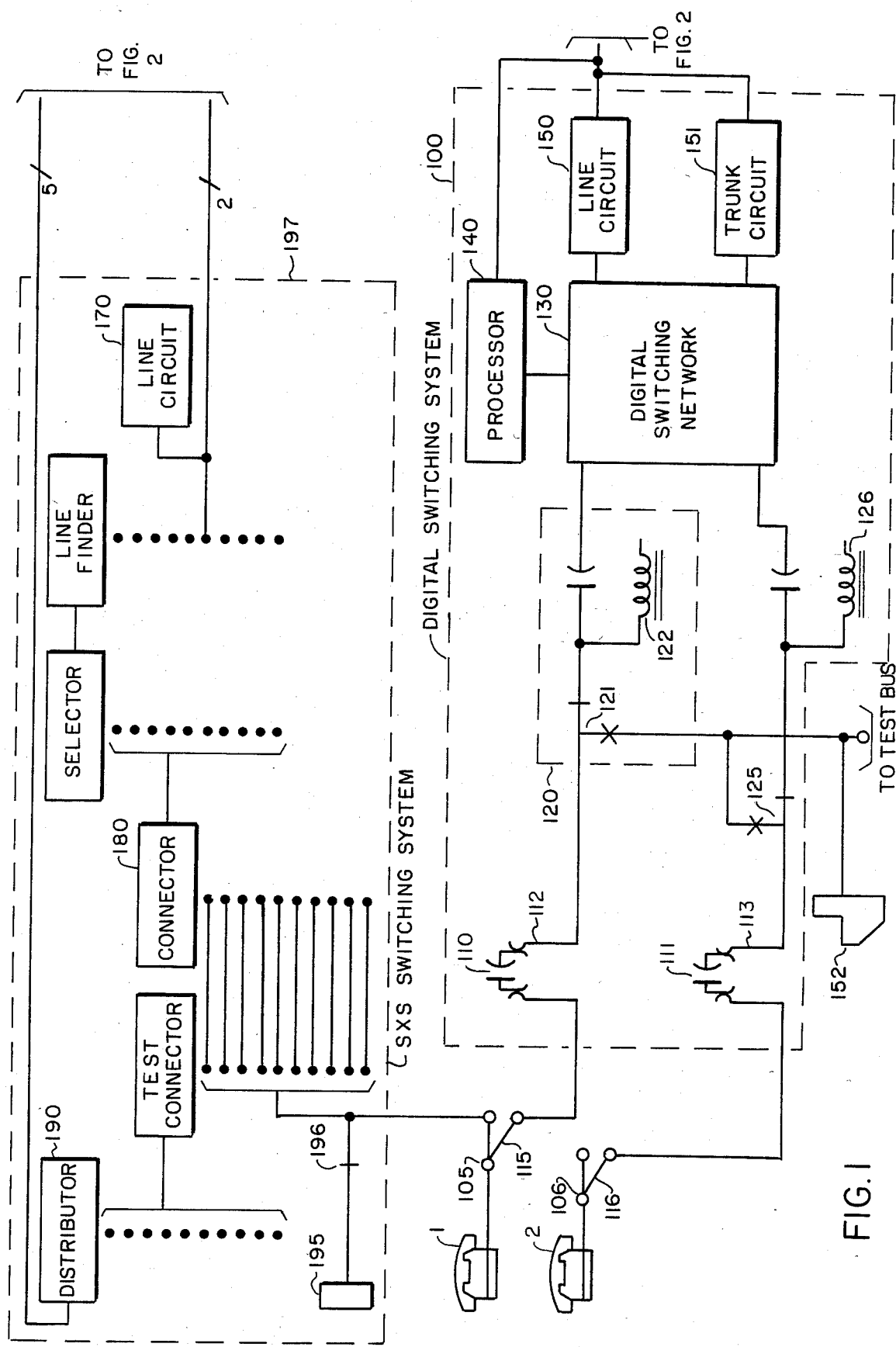
FIG. 1 is a schematic diagram of an arrangement for single line testing in accordance with the principle of operation of the present invention.

Referring to the drawing FIG. 1, two telephone subscribers 1 and 2 are shown connected to a step-by-step switching system 197 and to a digital switching system 100. Subscriber 1 is connected to these switching systems via the double jumper connection at 105 and subscriber 2 is connected to both switching systems via the double jumper connection at 106. A step-by-step switching system is shown, although this invention may be practiced with other electromechanical switching systems as well (e.g. No. 1 EAX, No. 2 EAX, manufactured by GTE Automatic Electric Incorporated or others). The digital switching system is a time switching system such as, the GTD-5 EAX (manufactured by GTE Automatic Electric Incorporated) or other time division switching systems having similar features of other manufacturers.

The subscribers are shown connected to the digital switching system via capacitors 110 and 111. These capacitors are used only during the testing phase, normally the jacks 112 and 113 connect the line conductors through to the line circuits such as 120.

Subscriber 1 is connected through capacitor 110 to line circuit 120. Line circuit 120 includes a test relay with make-break contacts 121 and a battery feed device 122. Contacts 121 are normally closed to maintain subscriber 1 connected to the switching network 130. Contacts 121 may be operated to enable the line of subscriber 1 to be connected to a test bus for maintenance accesses. Similarly, subscriber 2 may be connected to this test bus via the operation of contacts 125.

The digital switching system includes a processor 140, which is operatively connected to digital switching network 130. Line circuit 150 and trunk circuit 151 are connected to the switching network 130 and provide for connecting subscribers 1 and 2 to other subscribers or to other switching systems. Processor 140 includes a CPU arrangement with a memory containing a data base for operating the switching system. This data base enables the digital switching system to associate particular subscribers with particular line circuits and other equipment.

The digital switching system is in the precutover condition, that is, not in a fully tested and operative configuration to provide telephone service to the subscribers. The step-by-step switching system is on-line and provides active telephone service to subscribers 1 and 2, until cutover of the digital switching system.

Subscriber 1 is thus connected via double jumpers at 105, to the contact banks of connector 180. Quiescent operating potentials are applied to each subscriber's line via a line relay 195 connected in series with the break contact 196 of a cutoff relay. When a subscriber is called, the line relay 195 is disconnected by the operation of the cutoff relay and the line is switched through to a battery feed device of a connector or junctor or other similar circuit.

Figure 2:
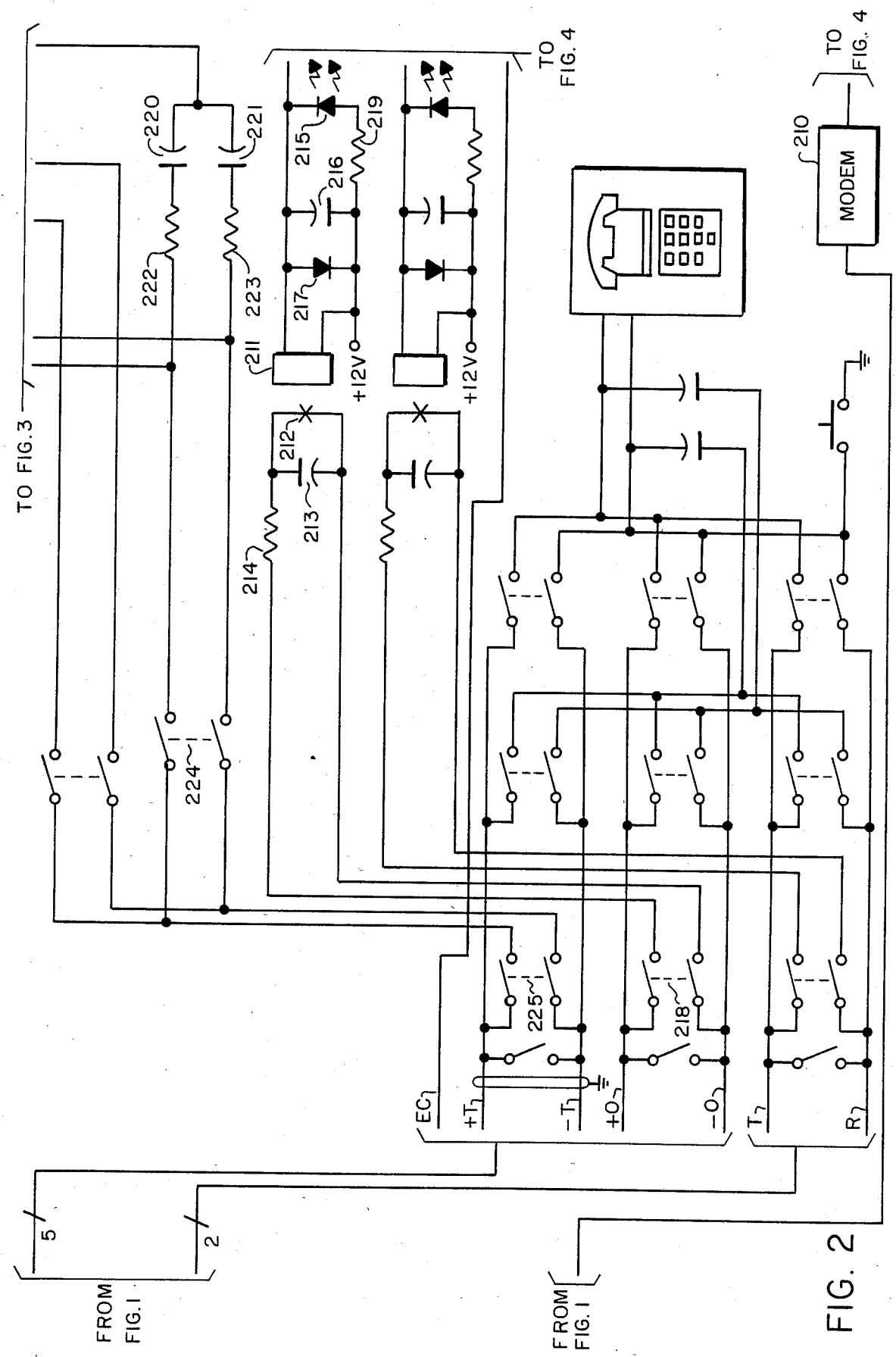
FIGS. 2, 3 and 4 when placed together as shown on FIG. 5 disclose the interface of the testing system.
Figure 3:
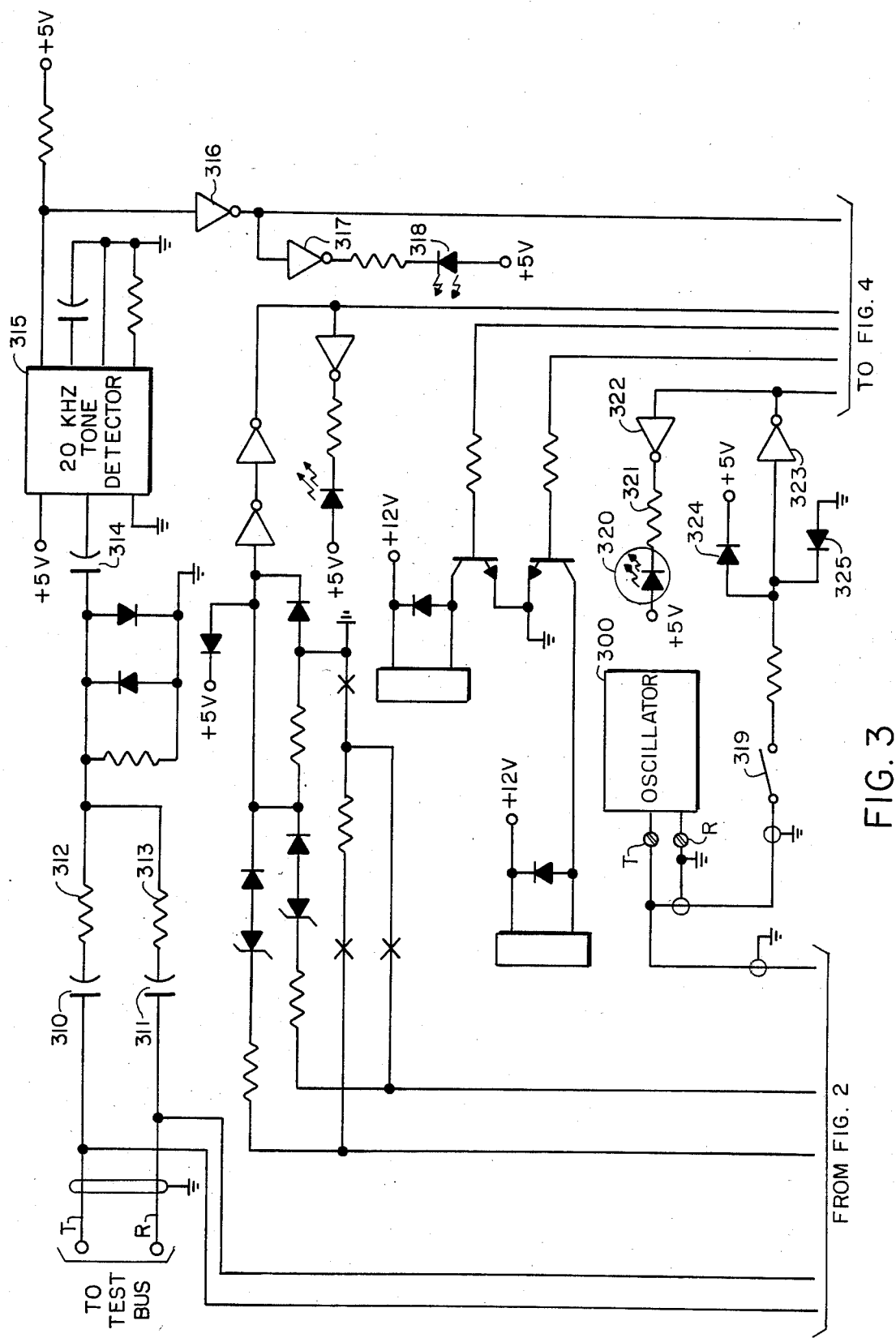
Figure 4:
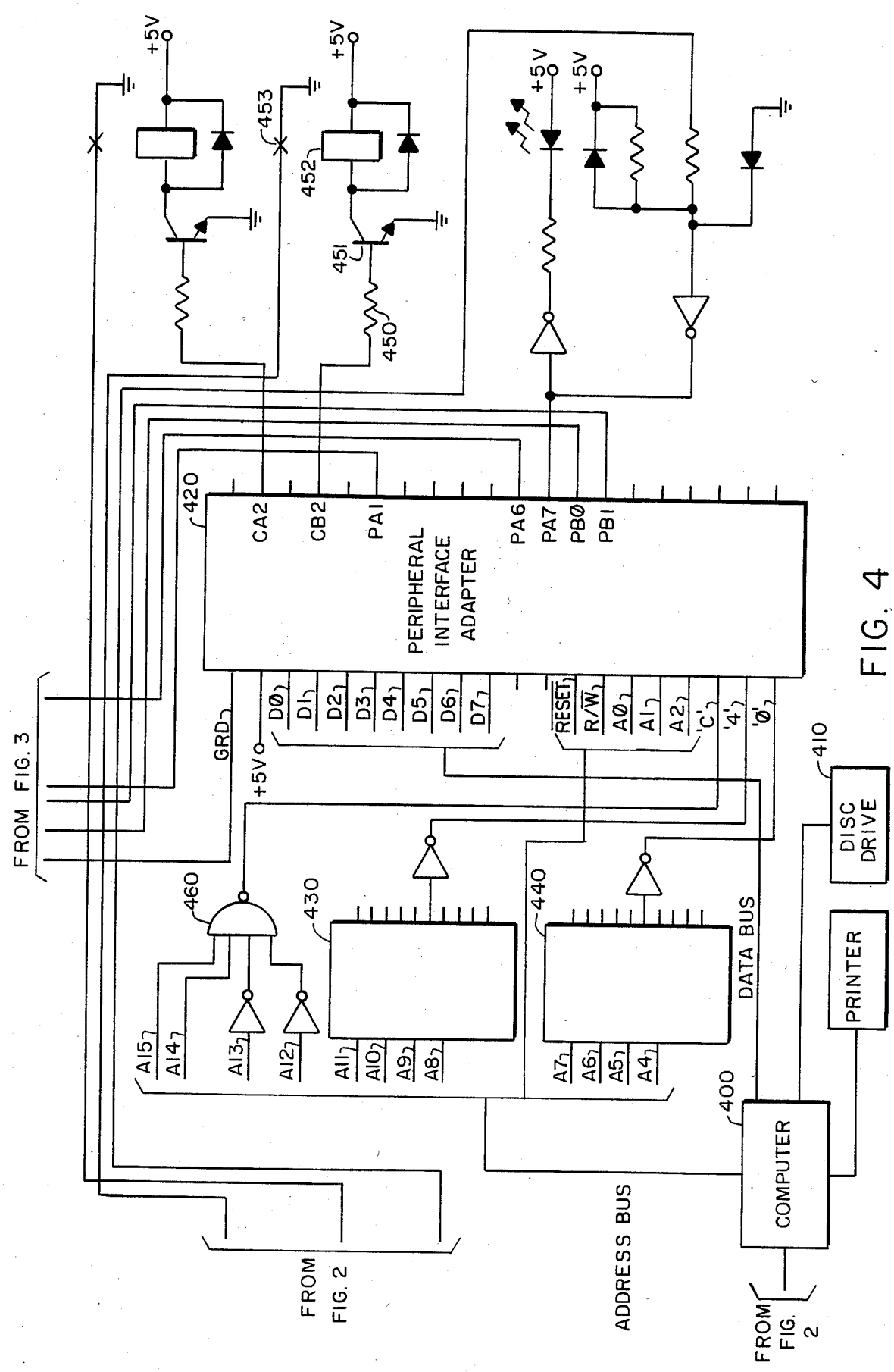

The line jumper verification system of FIGS. 2, 3 and 4 is connected to both the step-by-step switching system and to the digital switching system. The testing system shown is a microcomputer controlled test system which is arranged to provide for a number of line verification and ringing tests of the digital switching system before it is put into active service. These tests include: verifying that the assigned directory number will reach the same subscriber line from either the step-by-step switching system or the digital switching system. When this and any other incidental function has been successfully tested on each of the subscriber lines, the digital switching system may be placed into operational service and the step-by-step switching system may be removed from service.

The test system disclosed tests the connection from subscriber station 1 to the digital switching system. In the pre-operational configuration, the digital switching system has capacitors 110 and 111 inserted in the line conductor path which serves to open circuit subscribers 1 and 2 from the switching network 130.

In order to test the line of subscriber 1, a unique path must be established through the digital switching system. Since the line of subscriber 1 is to be tested, processor 140 instructs the digital switching network 130 to operate a test relay having contacts 121 to disconnect subscriber 1 from the switching network and connect the subscriber to the test bus, as if, the access is a test access. Subscriber 1 is now connected through capacitor 112 and line circuit 120 to the test bus. As a result, subscriber 1 has been isolated from subscriber 2 for testing purposes while at the same time both subscribers 1 and 2 retain an operational access to the step-by-step switching system.

The test equipment includes an Apple IIE Computer as described in publication, A2L2001 Copyright 1982, 1983 (030-0356-C), with an associated disc memory for data storage, a printer for printing out test results along with associated interface circuitry to the exchanges to be tested. The interface equipment includes a key cabinet and telephone for use by the maintenance or test personnel as may be required in verifying reported conditions. As shown in the illustrated embodiment, the access to the exchanges to be tested, the exchange to be removed from service and the exchange that is to replace it is through the interface circuitry. A direct data path is also included between the Apple Computer 400 and the processor 140 of the digital exchange 100.

In operating this test system the directory numbers to be tested are loaded into the associated disc memory 410. The Apple Computer 400 acting as a sequencing and control processor, issues a command "ACCESS DN XXX-XXXX CONN JACK 0" to the digital switching system 100 of FIG. 1 via an RS-232 data link 210. The digital switching system will respond by connecting the line to be tested to the test bus at contacts 121. The test bus is connected via capacitors 310, 311, resistors 312, 313 and capacitor 314 to a tone detector 315, which in turn has a connection via amplifier 316 back through a peripheral interface adapter 420 and a data bus to the computer 400. This last path is energized by the tone detector upon detecting a tone on the test bus. A second indicator is also available in the form of a light emitting diode 318 operated via amplifier 317 from the detector 315 output to indicate visually that a tone has been detected.

After completing the connection at the digital switch 100, the computer 400 proceeds to seize the test distributor 190 to dial it up to the subscriber terminal in the old office. The dial control path to the test distributor is from the computer 440 and includes the address decodes 430, 440, 460 and the data bus path via the peripheral interface adapter 420 through which the pulses for controlling the pulsing relay 452 at contacts 453 are controlled. The pulsing path is via resistor 450 and amplifier transistor 451. The pulsing path from contacts 453 controls slave relay 211 which operates the actual pulsing contacts 212, through the manually set connect contacts 218 to the test distributor 190. Resistor 214 and capacitor 213 aid in contact spark suppression, while diode 217 and capacitor 216 suppress the relay winding inductive spikes. Diode 215 is a light emitting diode that flashes to indicate dialing is in progress. Upon completion of the test connection to the subscriber terminal in the step-by-step switching system 197 the test tone oscillator 300 output path is complete via capacitors 220, 221, resistors 222 and 223, manually set connect contacts 224 and 225 to the test leads of the test distributor 190.

Thus a path is now completed for the tone from the oscillator 300 through the step-by-step exchange 197 through switch 190 to the subscriber station terminal 105, via the existing jumper to the subscriber station terminal 105 through the newly installed jumpers 115, via capacitor 110 through the test bus connect contact 121 and the test bus to the tone detector 314. The test tone used is in the range of 20 KHz. This is not normally audible thus permitting the performance of these tests at any time even if the terminal under test is in use by the subscriber. Normally, the test tone should be detected within about three seconds, and indicated to the computer by the tone detector via amplifier 316. If no indication of a successful completion is received within this interval the computer 400 through the interface with the digital switching system 100 issues a command "EXAMINE DN XXX-XXXX" is sent and the line hardware identity will be returned to the computer for test personnel verification and correction as required by causing the printing out of a trouble report.

Additional equipment shown is included for use by the test personnel in the performance of manual testing and verification of the test results.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a pre-cutover switching configuration, an arrangement for single line testing comprising:
   at least first and second switching system subscribers;
   a first switching system connected to said first and second switching system subscribers, said first switching system being operated to connect said first and second subscribers to any switching system subscribers;
   a second switching system connected to said first and second switching system subscribers, said second switching system being in an untested condition, said second switching system comprising:
      a switching network connected to said first and second subscribers;
      capacitor means for direct current isolating said first and said second subscribers from said second switching system;
      means for switching connected between said switching network and said capacitor means, said means for switching being operated to connect said first subscriber to a test interface bus, said means for switching being normally operated to maintain said connection of said first subscriber to said switching network; and
      processor means connected to said switching network;
   said arrangement for single line testing further comprising:
   tone detection means connected to said test interface bus and tone generating means;
   means for testing connected to said first switching system and to said switching network of said second switching system, said means for testing being operated to request connection of said tone generating means to said first switching system subscriber via said first switching system;
   said processor means being responsive to said means for testing to operate said means for switching for connecting said first subscriber to said test interface bus; and
   said tone detection means being operated to signal a correct connection of said first subscriber to said test means upon detecting a tone on said test interface bus.

2. An arrangement for single line testing as claimed in claim 1, said means for switching including:
   a make-break relay having a make and a break contact;
   said make contact being operated to connect said first subscriber to said test interface bus;
   a battery feed device connected to said first subscriber via said break contact; and
   said break contact being operated to open circuit said subscriber from said battery feed device.

3. An arrangement for single line testing as claimed in claim 1, wherein said connection of said means for testing to said switching network includes a line circuit.

4. An arrangement for single line testing as claimed in claim 1, wherein said connection of said means for testing to said switching network includes a trunk circuit.

5. An arrangement for single line testing as claimed in claim 1, wherein said switching network includes a digital switching network.

6. An arrangement for single line testing as claimed in claim 1, said means for testing including:
   data terminal means connected to said means for testing, said data terminal means operated in response to said tone detection means signal to print out testing information for said associated subscriber.

* * * * *